US012601661B2

(12) United States Patent
Liu et al.

(10) Patent No.: US 12,601,661 B2
(45) Date of Patent: Apr. 14, 2026

(54) TISSUE PROCESSOR

(71) Applicant: LEICA BIOSYSTEMS NUSSLOCH GMBH, Nussloch (DE)

(72) Inventors: Bin Liu, Shanghai (CN); Qi Cheng, Shanghai (CN)

(73) Assignee: Leica Biosystems Nussloch GmbH, Nussloch (DE)

( * ) Notice: Subject to any disclaimer, the term of this patent is extended or adjusted under 35 U.S.C. 154(b) by 586 days.

(21) Appl. No.: 18/014,161

(22) PCT Filed: Jul. 31, 2020

(86) PCT No.: PCT/CN2020/106114
§ 371 (c)(1),
(2) Date: Jan. 2, 2023

(87) PCT Pub. No.: WO2022/021288
PCT Pub. Date: Feb. 3, 2022

(65) Prior Publication Data
US 2023/0266210 A1 Aug. 24, 2023

(51) Int. Cl.
*G01N 1/31* (2006.01)

(52) U.S. Cl.
CPC ...................................... *G01N 1/31* (2013.01)

(58) Field of Classification Search
CPC .............. G01N 1/31; G01N 1/34; G01N 1/36
See application file for complete search history.

(56) References Cited

U.S. PATENT DOCUMENTS

| | | | |
|---|---|---|---|
| 8,071,026 B2 | 12/2011 | Rapp et al. | |
| 2007/0243626 A1 | 10/2007 | Windeyer et al. | |
| 2008/0220468 A1 | 9/2008 | Windeyer et al. | |
| (Continued) | | | |

FOREIGN PATENT DOCUMENTS

| | | |
|---|---|---|
| CN | 101373172 A | 2/2009 |
| CN | 102250692 A | 11/2011 |
| (Continued) | | |

OTHER PUBLICATIONS

Japanese Notice of Reasons for Refusal for Japanese Application No. 2023-503512, dated Feb. 27, 2024, 4 pages.
(Continued)

*Primary Examiner* — Jennifer Wecker
*Assistant Examiner* — Steven Ray Castaneda
(74) *Attorney, Agent, or Firm* — Kinney & Lange, P.A.

(57) ABSTRACT
A tissue processor includes first and second retorts; reagent bottles fluidly coupled with the first and second retorts; infiltrating baths fluidly coupled with first and second retorts; a pressure generating assembly providing positive or negative pressure in at least one of the first and second retorts, to draw or drain reagent or infiltrating material into or from the respective retort; and a rotary valve fluidly coupling first and second retorts with the reagent bottles, and selectively communicating one of the reagent bottles with the first and second retorts. The tissue processor further includes first and second trap bottles, the first trap bottle is fluidly coupled between the first retort and the pressure generating assembly, the second trap bottle is fluidly coupled between the second retort and the pressure generating assembly, the first and second trap bottles condense reagent vapor or infiltrating material vapor from the first and second retorts, respectively.

15 Claims, 3 Drawing Sheets

(56) References Cited

U.S. PATENT DOCUMENTS

| | | | |
|---|---|---|---|
| 2010/0055777 | A1 | 3/2010 | Rapp et al. |
| 2020/0174029 | A1 | 6/2020 | Sears et al. |

FOREIGN PATENT DOCUMENTS

| | | | |
|---|---|---|---|
| CN | 107400563 | A | 11/2017 |
| CN | 110869733 | A | 3/2020 |
| CN | 110876270 | A | 3/2020 |
| CN | 111289345 | A | 6/2020 |
| JP | 2000346767 | A | 12/2000 |
| JP | 2020531804 | A | 11/2020 |
| WO | 2019036760 | A1 | 2/2019 |
| WO | 2020000334 | A1 | 1/2020 |

OTHER PUBLICATIONS

Extended European Search Report for European Patent Application No. 20947346.1, dated Apr. 18, 2024, 9 pages.
First Chinese Office Action for Chinese Patent Application No. 20208102433.1, dated Jan. 11, 2025, 10 pages.
Communication pursuant to Article 94(3) EPC for European Patent Application No. 20947346.1, dated Sep. 24, 2025, 11 pages,.
International Search Report and Written Opinion for PCT Application No. PCT/CN2020/106114, dated Apr. 25, 2021, 7 pages,.

1000

10

40

20

120

30

TISSUE PROCESSOR

CROSS-REFERENCE TO RELATED APPLICATIONS

The present application is a national phase entry under 35 USC § 371 of International Application PCT/CN2020/106114, filed Jul. 31, 2020, the entire disclosure of which is incorporated herein by reference.

FIELD

The present disclosure relates to a field of tissue processing technologies, more particularly to a tissue processor.

BACKGROUND

Histological tissue specimen preparation is a physical process that involves chemical solutions reacting with biological specimens. Typically specimens such as tissue samples from biopsies and autopsies require processing. The end result of such processing is a sample that has been preserved, and been infiltrated with paraffin. Once the tissue has been embedded in the paraffin, it is stable and may then be subsequently embedded and then sectioned on a microtome.

This process has typically involved four different subprocedures: fixation, dehydration, clearing, and infiltration.

Fixation is a process by means of which cell proteins are stabilised, and the process is normally performed using chemical solutions. A good fixative is usually a fluid that will neither shrink nor swell the tissue, and more particularly will not dissolve its constituent parts, but will kill bacteria and render enzymes inactive. The most commonly used chemical solution is formalin.

Since the ultimate purpose of tissue specimen treatment is to infiltrate the tissue sample in paraffin, and since water and paraffin are not miscible, the sample must be dehydrated after the fixation step. This is usually achieved by subjecting the tissue sample to increasing concentrations of alcohols.

After dehydration, the tissue sample is still not capable of accepting paraffin since paraffin and alcohol are not miscible. A chemical solution, selected to be miscible with both alcohol and paraffin, is used to clear the alcohol from the sample. The chemical solution most commonly used is xylene.

The fourth and final step in the tissue sample treatment is infiltrating the sample, usually with paraffin wax. In this step the cleared tissue samples are placed into paraffin heated to a few degrees above its melting temperature. Several changes of paraffin may be required to remove the residual xylene so that the tissue is completely infiltrated with the molten paraffin.

During tissue processing, a reagent vapor or an infiltrating material vapor may occur in the retorts of a tissue processor, and enter an air system of the tissue processor, which may lead to a blockage of the air system and cross contamination of different residual reagents. These may lead to low tissue processing quality.

SUMMARY

Embodiments of the present disclosure seek to solve at least one of the problems existing in the related art to at least some extent.

Embodiments of the present disclosure provide a tissue processor. The tissue processor includes: a first retort; a second retort; a plurality of reagent bottles fluidly coupled with the first retort and the second retort; a plurality of infiltrating baths fluidly coupled with the first retort and the second retort; a pressure generating assembly fluidly coupled with the first retort, the second retort, the plurality of reagent bottles, and the plurality of infiltrating baths, the pressure generating assembly providing positive or negative pressure in at least one of the first retort and the second retort, to draw or drain reagent or infiltrating material into or from the respective retort; and a rotary valve fluidly coupling the first and second retorts with the plurality of reagent bottles, and selectively communicating one of the plurality of reagent bottles with the first and second retorts, the tissue processor further includes a first trap bottle and a second trap bottle, the first trap bottle is fluidly coupled between the first retort and the pressure generating assembly, the second trap bottle is fluidly coupled between the second retort and the pressure generating assembly, the first trap bottle condenses reagent vapor or infiltrating material vapor from the first retort, and the second trap bottle condenses reagent vapor or infiltrating material vapor from the second retort.

In the tissue processor, by providing the first and second trap bottles fluidly coupled between the pressure generating assembly and the first and second retorts, the reagent vapor or infiltrating material vapor from the first and second retorts can be condensed by the first and second trap bottles, to prevent the reagent vapor or infiltrating material vapor from entering air tubes coupled between the pressure generating assembly and the first and second retorts. Therefore, the air system can be prevented from cross contamination by the different residual reagent, thereby improving the quality of the tissue processing. Furthermore, the tissue processor also has a simple structure and is low in cost.

In some embodiments, the tissue processor further includes a condensate bottle, and the condensate bottle is fluidly coupled with the first and second trap bottles, and collects condensate liquid from the first and second trap bottles. When the condensate bottle is full, it can be simply removed from the tissue processor and replaced by another empty condensate bottle, without affecting operation of the first and second trap bottles.

In some embodiments, the tissue processor further includes a first condensate liquid valve and a second condensate liquid valve, the first condensate liquid valve is fluidly coupled between the first trap bottle and the condensate bottle, and selectively communicates the first trap bottle with the condensate bottle; the second condensate liquid valve is fluidly coupled between the second trap bottle and the condensate bottle, and selectively communicates the second trap bottle with the condensate bottle. Therefore, the condensate liquid in the first and second trap bottles can be controlled to drain into the condensate bottle according to accrual requirements, without affecting normal operation of the tissue processing.

In some embodiments, the tissue processor further includes a third trap bottle, the third trap bottle is fluidly coupled between the plurality of infiltrating baths and the pressure generating assembly, and the third trap bottle condenses infiltrating material vapor from the plurality of infiltrating baths. Thus, the infiltrating material vapor from the plurality of infiltrating baths can be condensed by the third trap bottle, to prevent the infiltrating material vapor from entering air tubes coupled between the pressure generating assembly and the plurality of infiltrating baths.

In some embodiments, the tissue processor further includes a third condensate liquid valve, the third condensate liquid valve is fluidly coupled between the third trap bottle and the condensate bottle, and selectively communicates the third trap bottle with the condensate bottle. Thus, the condensate liquid in the third trap bottle can be controlled to drain into the condensate bottle according to accrual requirements, without affecting normal operation of the tissue processing.

In some embodiments, the tissue processor further includes an air manifold, the air manifold is in fluid communication with ambient, and fluidly couples the pressure generating assembly, the plurality of reagent bottles, the plurality of infiltrating baths, and the condensate bottle are fluidly coupled to the air manifold; the air manifold is inclined, a highest port of the air manifold is coupled to the ambient, and a lowest port of the air manifold is coupled to the condensate bottle. Thus, the air manifold can serve as a condenser, and the condensate liquid from the air may flow towards a lower part of the air manifold and be collected in the condensate bottle.

In some embodiments, the tissue processor further includes a valve manifold, and the valve manifold fluidly couples the first and second retorts with the rotary valve, and selectively communicates one of the plurality of the reagent bottles selected by the rotary valve with one of the first and second retorts. That is, the rotary valve and the valve manifold cooperatively communicate one of the plurality of reagent bottles with one of the first retort and the second retort.

In some embodiments, the tissue processor further includes a purge valve, and the purge valve is fluidly coupled between the valve manifold and the pressure generating assembly, and selectively communicates the valve manifold with the pressure generating assembly. Thus, compressed air can be introduced from the pressure generating assembly to flush and clean the valve manifold and an air tube coupled between the valve manifold and the rotary valve, preventing cross contamination by different residual reagents.

In some embodiments, the tissue processor further includes the purge valve is integrated on the valve manifold. Thus, the structure of the tissue processor may be simplified.

In some embodiments, the tissue processor further includes a clearing buffer, and the clearing buffer is fluidly coupled between the purge valve and the valve manifold, and draws or drains a clearing reagent from or into the plurality of regent bottles under the positive pressure or the negative pressure provided by the pressure generating assembly. Thus, clearing agent can be introduced repeatedly to flush and clean the valve manifold and the air tube coupled between the valve manifold and the rotary valve, preventing cross contamination by different residual reagents.

In some embodiments, the tissue processor further includes a first density meter and a second density meter, the first density meter is fluidly coupled between the valve manifold and the first retort, and the second density meter is fluidly coupled between the valve manifold and the second retort; the first and second density meters detect density of reagent transferred to the first and second retorts respectively. Thus, it can be determined that whether the reagent transferred to the first and second retorts is proper.

In some embodiments, the tissue processor further includes a first pressure sensor, a first relief valve, a second pressure sensor and a second relief valve, the first pressure sensor and the first relief valve are provided between the pressure generating assembly and the first retort, the first pressure sensor detects a first pressure in a first air tube coupled between the pressure generating assembly and the first retort, and when the detected pressure exceeds a safety threshold, the first relief valve is opened to relieve pressure; the second pressure sensor and the second relief valve are provided between the pressure generating assembly and the second retort, the second pressure sensor detects a second pressure in a second air tube coupled between the pressure generating assembly and the second retort, and when the detected second pressure exceeds the safety threshold, the second relief valve is opened to relieve pressure. Thus, the safety of the tissue processor can be ensured.

In some embodiments, the tissue processor further includes a remote connector, the remote connector is fluidly coupled to the rotary valve, and the remote connector is configured to couple a remote container, to draw reagent from the remote container, or drain the reagent to the remote container. The first and second retorts can be coupled to the remote container, thus an operator do not need to replace the plurality of reagent bottles frequently, to reduce labor intensity.

In some embodiments, the tissue processor further includes a drain connector, the drain connector is fluidly coupled to the plurality of infiltrating baths, and the drain connector is configured to couple a remote container, to drain the infiltrating material to the remote container. Thus, the infiltrating material can be facilitated to drain into the remote container.

In some embodiments, the tissue processor further includes a carbon filter, the pressure generating assembly is fluidly coupled to ambient through the carbon filter, and the carbon filter filters reagent fume out. Thus, the agent fume can be easily filtered out.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
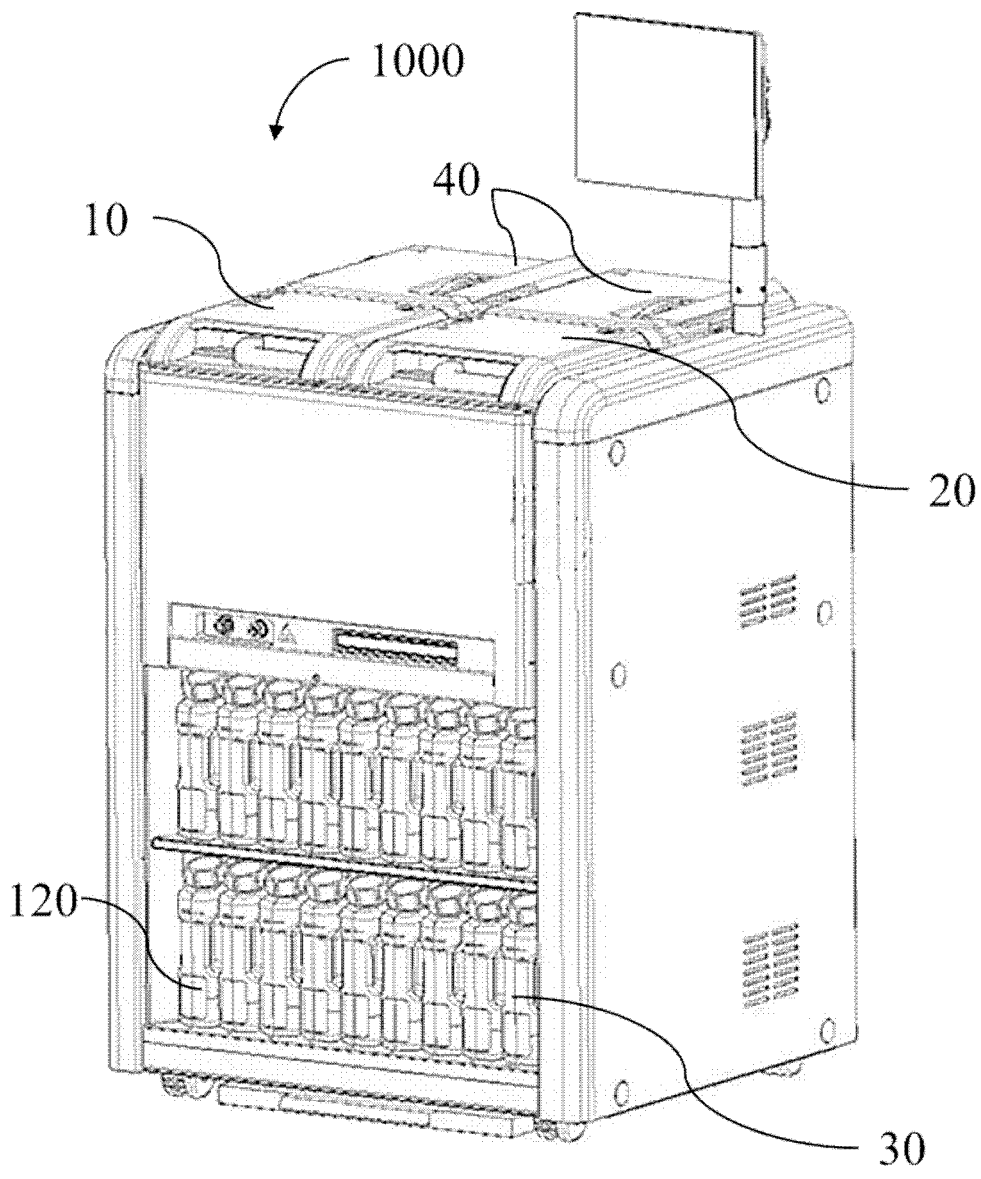
FIG. 1 is a perspective view of a tissue processor according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Figure 2:
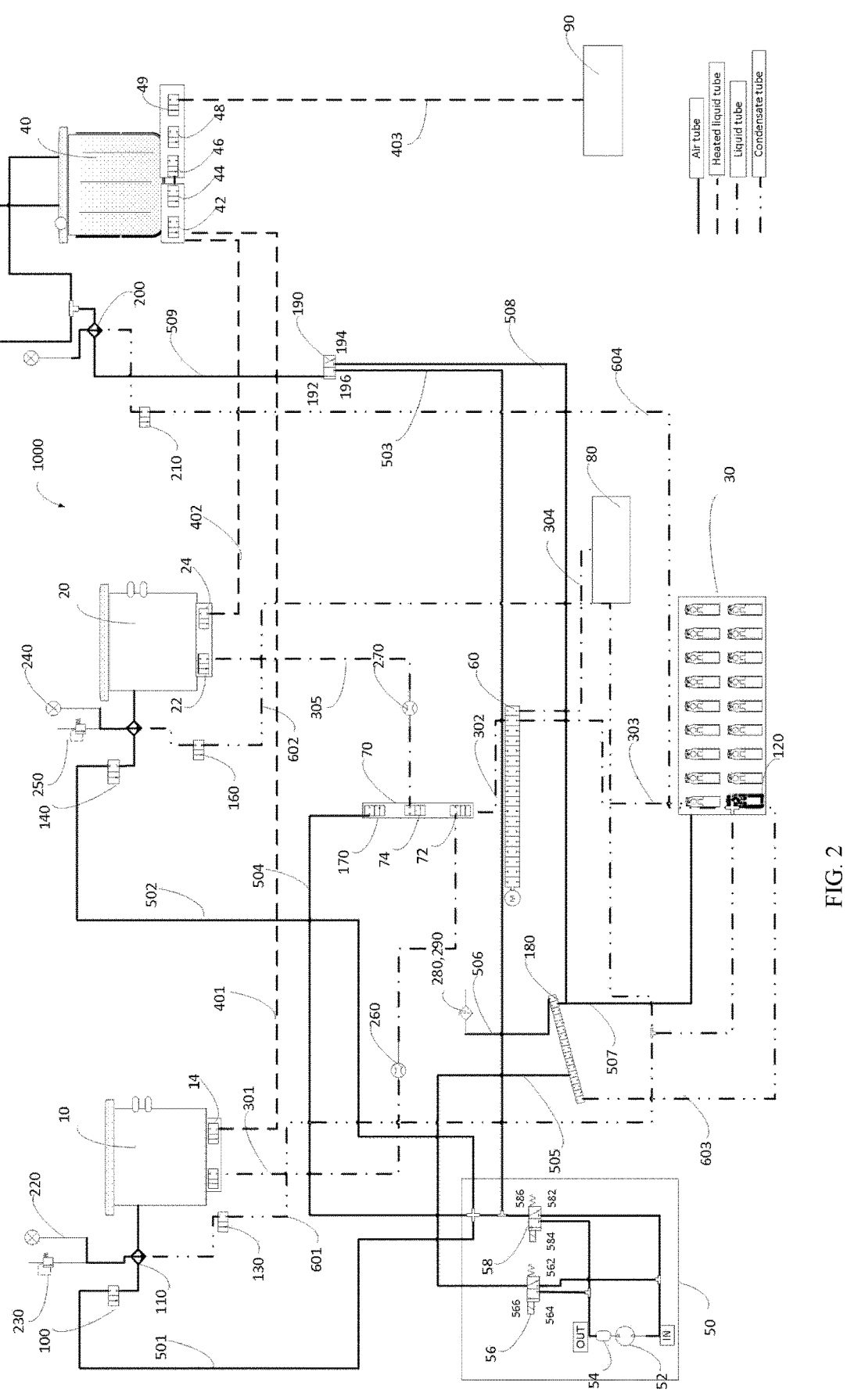
FIG. 2 is a schematic view of a tissue processor according to a first embodiment of the present disclosure.

According to embodiments of the present disclosure, as illustrated in FIGS. 1 and 2, a tissue processor 1000 includes: a first retort 10; a second retort 20; a plurality of reagent bottles 30 fluidly coupled with the first retort 10 and the second retort 20; a plurality of infiltrating baths 40 fluidly coupled with the first retort 10 and the second retort 20; a pressure generating assembly 50 fluidly coupled with the first retort 10, the second retort 20, the plurality of reagent bottles 30, and the plurality of infiltrating baths 40, the pressure generating assembly 50 providing positive or negative pressure in at least one of the first retort 10 and the second retort 20, to draw or drain reagent or infiltrating material into or from the respective retort; and a rotary valve 60 fluidly coupling the first and second retorts 10, 20 with the plurality of reagent bottles 30, and selectively communicating one of the plurality of reagent bottles 30 with the first and second retorts 10, 20.

For example, the pressure generating assembly 50 can set 45 kPa and −70 kPa pressure in the first and second retorts 10, 20. The reagent can transfer between the reagent bottles 30 and the first and second retorts 10, 20, or the infiltrating material can transfer between the first and second retorts 10, 20 and the plurality of infiltrating baths 40, to achieve the four sub-procedures of the tissue processing.

It could be understood that the plurality of reagent bottles 30 may contain different reagents for the fixation, dehydration, and clearing; and the plurality of infiltrating baths 40 may contain infiltrating material, e.g. paraffin, for infiltration.

As illustrated in FIG. 2, the tissue processor 1000 further includes a first trap bottle 110 and a second trap bottle 150, the first trap bottle 110 is fluidly coupled between the first retort 10 and the pressure generating assembly 50, the second trap bottle 150 is fluidly coupled between the second retort 20 and the pressure generating assembly 50, the first trap bottle 110 condenses reagent vapor or infiltrating material vapor from the first retort 10, and the second trap bottle 150 condenses reagent vapor or infiltrating material vapor from the second retort 20.

In the tissue processor 1000, by providing the first and second trap bottles 110,150 fluidly coupled between the pressure generating assembly 50 and the first and second retorts 10, 20, the reagent vapor or infiltrating material vapor from the first and second retorts 10, 20 can be condensed by the first and second trap bottles 110,150, to prevent the reagent vapor or infiltrating material vapor from entering air tubes coupled between the pressure generating assembly 50 and the first and second retorts 10, 20. Therefore, the air system can be prevented from cross contamination by the different residual reagent, thereby improving the quality of the tissue processing. Furthermore, the tissue processor 1000 also has a simple structure and is low in cost.

As illustrated in FIG. 2, in some embodiments, the tissue processor 1000 further includes a condensate bottle 120, and the condensate bottle 120 is fluidly coupled with the first and second trap bottles 110,150, and collects condensate liquid from the first and second trap bottles 110,150. When the condensate bottle 120 is full, it can be simply removed from the tissue processor 1000 and replaced by another empty condensate bottle 120, without affecting operation of the first and second trap bottles 110,150.

As illustrated in FIG. 2, in some embodiments, the tissue processor 1000 further includes a first condensate liquid valve and a second condensate liquid valve, the first condensate liquid valve is fluidly coupled between the first trap bottle 110 and the condensate bottle 120, and selectively communicates the first trap bottle 110 with the condensate bottle 120; the second condensate liquid valve is fluidly coupled between the second trap bottle 150 and the condensate bottle 120, and selectively communicates the second trap bottle 150 with the condensate bottle 120. Therefore, the condensate liquid in the first and second trap bottles 110,150 can be controlled to drain into the condensate bottle 120 according to accrual requirements, without affecting normal operation of the tissue processing.

As illustrated in FIG. 2, in some embodiments, the tissue processor 1000 further includes a third trap bottle 200, the third trap bottle 200 is fluidly coupled between the plurality of infiltrating baths 40 and the pressure generating assembly 50, and the third trap bottle 200 condenses infiltrating material vapor from the plurality of infiltrating baths 40. Thus, the infiltrating material vapor from the plurality of infiltrating baths 40 can be condensed by the third trap bottle 200, to prevent the infiltrating material vapor from entering air tubes coupled between the pressure generating assembly 50 and the plurality of infiltrating baths 40. In some embodiments, the first, second and third trap bottles 110, 150, 200 may be stainless steel bottles, which have strong heat dissipation capacity to condense the reagent vapor or the infiltrating material vapor, and can collect the condensate liquid.

As illustrated in FIG. 2, in some embodiments, the tissue processor 1000 further includes a third condensate liquid valve, the third condensate liquid valve is fluidly coupled between the third trap bottle 200 and the condensate bottle 120, and selectively communicates the third trap bottle 200 with the condensate bottle 120. Thus, the condensate liquid in the third trap bottle 200 can be controlled to drain into the condensate bottle 120 according to accrual requirements, without affecting normal operation of the tissue processing.

For example, the pressure generating assembly 50 may set −40 kPa pressure cycles (40 seconds for 1 cycle) in the plurality of infiltrating baths 40, and then third condensate liquid valve may be opened to allow the third trap bottle 200 to drain the condensate liquid to the condensate bottle 120.

As illustrated in FIG. 2, in some embodiments, the tissue processor 1000 further includes an air manifold 180, the air manifold 180 is in fluid communication with ambient, and the pressure generating assembly 50, the plurality of reagent bottles 30, the plurality of infiltrating baths 40, and the condensate bottle 120 are fluidly coupled to the air manifold 180; the air manifold 180 is inclined, a highest port of the air manifold 180 is coupled to the ambient, and a lowest port of the air manifold 180 is coupled to the condensate bottle 120. Thus, the air manifold 180 can serve as a condenser, and the condensate liquid from the air may flow towards a lower part of the air manifold 180 and be collected in the condensate bottle 120.

As illustrated in FIG. 2, in some embodiments, the tissue processor 1000 further includes a valve manifold 70, the valve manifold 70 fluidly couples the first and second retorts 10, 20 with the rotary valve 60, and selectively communicates one of the plurality of the reagent bottles 30 selected by the rotary valve 60 with one of the first and second retorts 10, 20. That is, the rotary valve 60 and the valve manifold 70 cooperatively communicate one of the plurality of reagent bottles 30 with one of the first retort 10 and the second retort 20.

As illustrated in FIG. 2, in some embodiments, the tissue processor 1000 further includes a purge valve, the purge valve is fluidly coupled between the valve manifold 70 and the pressure generating assembly 50, and selectively communicates the valve manifold 70 with the pressure generating assembly 50. Thus, compressed air can be introduced from the pressure generating assembly 50 to flush and clean the valve manifold 70 and an air tube coupled between the valve manifold 70 and the rotary valve 60, preventing cross contamination by different residual reagents.

As illustrated in FIG. 2, in some embodiments, the tissue processor 1000 further includes the purge valve is integrated on the valve manifold 70. Thus, the structure of the tissue processor 1000 may be simplified.

Figure 3:
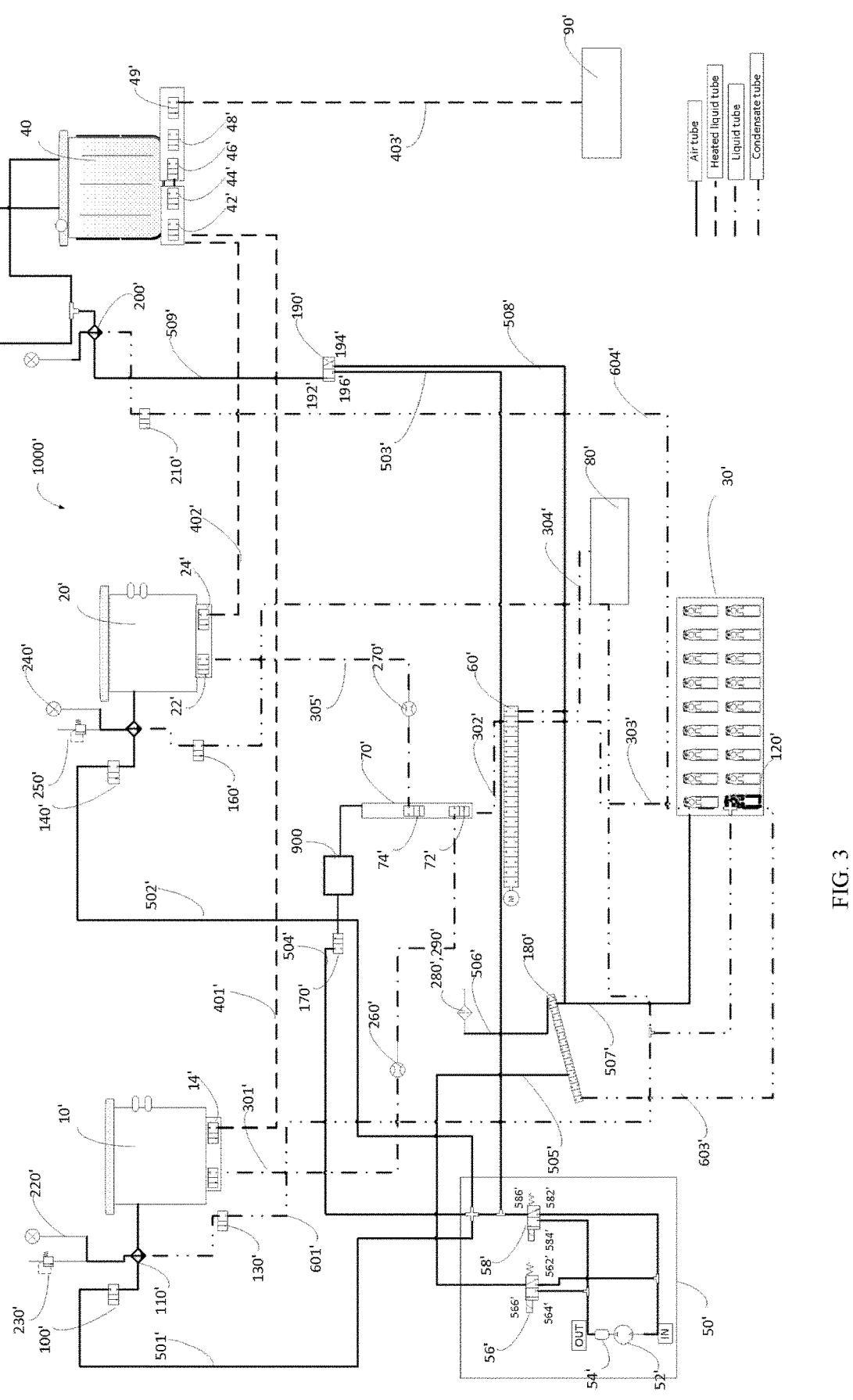
FIG. 3 is a schematic view of a tissue processor according to a second embodiment of the present disclosure.

As illustrated in FIG. 3, in some embodiments, the tissue processor 1000 further includes a clearing buffer 900, the clearing buffer 900 is fluidly coupled between the purge valve and the valve manifold 70, and draws or drains a clearing reagent from or into the plurality of regent bottles under the positive pressure or the negative pressure provided by the pressure generating assembly 50. Thus, clearing agent can be introduced repeatedly to flush and clean the valve manifold 70 and the air tube coupled between the valve manifold 70 and the rotary valve 60, preventing cross contamination by different residual reagents. In some embodiments, the clearing buffer 900 may be another retort.

As illustrated in FIG. 2, in some embodiments, the tissue processor 1000 further includes a first density meter 260 and a second density meter 270, the first density meter 260 is fluidly coupled between the valve manifold 70 and the first retort 10, and the second density meter 270 is fluidly coupled between the valve manifold 70 and the second retort 20; the first and second density meters 260, 270 detect density of reagent transferred to the first and second retorts 10, 20 respectively. Thus, it can be determined that whether the reagent transferred to the first and second retorts 10, 20 is proper.

As illustrated in FIG. 2, in some embodiments, the tissue processor 1000 further includes a first pressure sensor 220, a first relief valve 230, a second pressure sensor 240 and a second relief valve 250, the first pressure sensor 220 and the first relief valve 230 are provided between the pressure generating assembly 50 and the first retort 10, the first pressure sensor 220 detects a first pressure in a first air tube 501 coupled between the pressure generating assembly 50 and the first retort 10, and when the detected pressure exceeds a safety threshold, the first relief valve 230 is opened to relieve pressure; the second pressure sensor 240 and the second relief valve 250 are provided between the pressure generating assembly 50 and the second retort 20, the second pressure sensor 240 detects a second pressure in a second air tube 502 coupled between the pressure generating assembly 50 and the second retort 20, and when the detected second pressure exceeds the safety threshold, the second relief valve 250 is opened to relieve pressure. Thus, the safety of the tissue processor 1000 can be ensured.

As illustrated in FIG. 2, in some embodiments, the tissue processor 1000 further includes a remote connector 80, the remote connector 80 is fluidly coupled to the rotary valve 60, and the remote connector 80 is configured to couple a remote container, to draw reagent from the remote container, or drain the reagent to the remote container. The first and second retorts 10, 20 can be coupled to the remote container, thus an operator do not need to replace the plurality of reagent bottles 30 frequently, to reduce labor intensity.

For example, the rotary valve 60 can select the remote connector 80, and then the pressure generating assembly 50 can set 45 kPa or −70 kPa pressure in the retorts 10, 20 to achieve remote fill/drain function.

As illustrated in FIG. 2, in some embodiments, the tissue processor 1000 further includes a drain connector 90, the drain connector 90 is fluidly coupled to the plurality of infiltrating baths 40, and the drain connector 90 is configured to couple a second remote container, to drain the infiltrating material to the second remote container. Thus, the infiltrating material can be facilitated to drain into the second remote container.

As illustrated in FIG. 2, in some embodiments, the tissue processor 1000 further includes a carbon filter 290, the pressure generating assembly 50 is fluidly coupled to ambient through the carbon filter 290, and the carbon filter 290 filters reagent fume out. Thus, the agent fume can be easily filtered out.

As illustrated in FIGS. 1 and 2, a tissue processor 1000 according to a first embodiment of the present disclosure will be described in detail below.

The tissue processor 1000 according to the present disclosure includes a first retort 10 and a second retort 20, seventeen reagent bottles 30 and four infiltrating baths 40, and a pressure generating assembly 50. The first and second retorts 10, 20 are in fluid communication with the seventeen reagent bottles 30, the four infiltrating baths 40 and the pressure generating assembly 50.

The tissue processor 1000 further includes a rotary valve 60. The rotary valve 60 has eighteen positions. The first and second retorts 10, 20 are in fluid communication with the seventeen reagent bottles 30 or a remote connector 80 through the rotary valve 60. The rotary valve 60 selectively communicates one of seventeen reagent bottles 30 or the remote connector 80 with the first and second retorts 10, 20. The remote connector 80 may be fluidly coupled to a remote container, to draw reagent from the remote container into the first and second retorts 10, 20 or drain the reagent in the first and second retorts 10, 20 to the remote container.

The tissue processor 1000 further includes a valve manifold 70. The first and second retorts 10, 20 are in fluid communication with the rotary valve 60 through the valve manifold 70. The valve manifold 70 selectively communicates one of the seventeen reagent bottles 30 or the remote connector 80 selected by the rotary valve 60 with one of the first and second retorts 10, 20.

The first retort 10 is fluidly coupled with the valve manifold 70 via a first liquid tube 301, the valve manifold 70 is fluidly coupled with the rotary valve 60 via a second liquid tube 302, the rotary valve 60 is fluidly coupled with the seventeen reagent bottles 30 via seventeen third liquid tubes 303 respectively (only one third liquid tube 303 is illustrated in FIG. 2 for good intelligibility), and the rotary valve 60 is fluidly coupled with the remote connector 80 via a fourth tube 304.

The first retort 10 is provided with a first liquid valve 12 thereon, which is in fluid communication with an interior of the first retort 10 and the first liquid tube 301. The first liquid valve 12 selectively opens or closes the first retort 10, to allow the reagent to enter or exit from the first retort 10 through the first liquid tube 301.

The first retort 10 is in fluid communication with the four infiltrating baths 40 via a first heated tube 401. The first retort 10 is provided with a second liquid valve 14 thereon, which is in fluid communication with the interior of the first retort and the first heated liquid tube 401. The second liquid valve 12 selectively opens or closes the first retort 10, to allow the infiltrating material to enter or exit from the first retort 10 through the first heated liquid tube 401.

The second retort 20 is fluidly coupled with the valve manifold 70 via a fifth liquid tube 305. The second retort 20 is provided with a third liquid valve 22 thereon, which is in fluid communication with an interior of the second retort 20 and the fifth liquid tube 305. The third liquid valve 22 selectively opens or closes the second retort 20, to allow the reagent to enter or exit from the second retort 20 through the fifth liquid tube 305.

The second retort 20 is in fluid communication with the four infiltrating baths 40 via a second heated tube 402. The second retort 20 is provided with a fourth liquid valve 24 thereon, which is in fluid communication with the interior of the second retort 20 and the second heated liquid tube 402.

The fourth liquid valve 24 selectively opens or closes the second retort 20, to allow the infiltrating material to enter or exit from the second retort 20 through the second heated liquid tube 402.

The four infiltrating baths 40 are provided with four liquid valves respectively, i.e. a fifth liquid valve 42, a sixth liquid valve 44, a seventh liquid valve 46, and an eighth liquid valve 48. Each of the fifth liquid valve 42, the sixth liquid valve 44, the seventh liquid valve 46, and the eighth liquid valve 48 is in fluid communication with an interior of the respective infiltrating bath 40 and the first and second retorts 10, 20, and selectively opens or closes the respective infiltrating bath 40, to allow the infiltrating material to enter or exit from the first and second retorts through the first and second heated liquid tube 401, 402.

The four infiltrating baths 40 are fluidly coupled to a drain connector 90 via a third heated liquid tube 403. The drain connector 90 may be fluidly coupled to a second remote container, to drain the infiltrating material in the four infiltrating baths 40 to the second remote container.

The four infiltrating baths 40 are provided with a ninth liquid valve 49, which is in fluid communication with the interior of the four infiltrating baths 40 and the drain connector 90, and selectively opens or closes the four infiltrating baths 40, to allow the infiltrating material to drain from the four infiltrating baths 40 to the second remote container.

The valve manifold 70 is provided with a tenth liquid valve 72 and an eleventh liquid valve 74 thereon. The first retort 10 is fluidly coupled to the rotary valve 60 through the tenth liquid valve 72, and the tenth liquid valve 72 selectively communicates the first retort 10 with the rotary valve 60. The second retort 20 is fluidly coupled to the rotary valve 60 through the eleventh liquid valve 74, and the eleventh liquid valve 74 selectively communicates the second retort 20 with the rotary valve 60. That is, the valve manifold 70 may selectively communicate one of the first and second retorts 10, 20 with one of the seventeen reagent bottles 30 and the remote connector 80 selected by the rotary valve 60.

The pressure generating assembly 50 includes a pump 52, a compensator 54, a first air valve 56 and a second air valve 58.

The pump 52 has an input end 522 and an output end 524. The first air valve 56 has a first normally-open port 562, a first normally-closed port 564, and a first common port 566; and the second air valve 58 has a second normally-open port 582, a second normally-closed port 584, and a second common port 586. The first normally-open port 562 and the second normally-open port 582 are fluidly coupled to the input end 522 of the pump 52, and the first normally-closed port 564 and the second normally-closed port 584 are fluidly coupled to the output end 524 of the pump 52.

The second common port 586 is fluidly coupled to the first retort 10, the second retort 20, the four infiltrating baths 40, and the valve manifold 70. The second common port 586 is fluidly coupled to the first retort 10 via a first air tube 501, the second common port 586 is fluidly coupled to the second retort 20 via a second air tube 502, the second common port 586 is fluidly coupled to the four infiltrating baths 40 via a third air tube 503, and the second common port 586 is fluidly coupled to the valve manifold 70 via a fourth air tube 504.

A third air valve 100 is provided in the first air tube 501, and selectively couples the second common port 586 and the first retort 10.

The tissue processor 1000 further includes a first trap bottle 110. The first trap bottle 110 is provided in the first air tube 501, between the third air valve 100 and the first retort 10. The first trap bottle 110 separates a reagent vapor or an infiltrating material vapor from the air and condenses it, to prevent the reagent vapor or the infiltrating material vapor from entering the first air tube 501. The first trap bottle 110 may be disposed adjacent to the first retort 10. Furthermore, a first cooling part may be provided at the first trap bottle 110 to facilitate condensing the reagent vapor or the infiltrating material vapor.

The first trap bottle 110 is fluidly coupled to a condensate bottle 120 via a first condensate tube 601.

A fourth air valve 130 (as an example of a first condensate liquid valve) is provided in the first condensate tube 601, and selectively communicates the first trap bottle 110 with the condensate bottle 120. That is, when the fourth air vale 130 is open, the condensate liquid in the first trap bottle 110 may be drained into the condensate bottle 120 via the first condensate tube 601. It could be understood, if positive pressure is proved in the first trap bottle 110 by the pressure generating assembly 50 through the first air tube 501, the condensate liquid may be discharged rapidly into the condensate bottle 120.

A fifth air valve 140 is provided in the second air tube 502, and selectively communicates the second common port 586 with the second retort 20.

The second trap bottle 150 is provided in the second air tube 502, between the fifth air valve 140 and the second retort 20. The second trap bottle 150 separates a reagent vapor or an infiltrating material vapor from the air and condenses it, to prevent the reagent vapor or the infiltrating material vapor from entering the second air tube 502. A second cooling part may be provided at the second trap bottle 150 to facilitate condensing the reagent vapor or the infiltrating material vapor.

The second trap bottle 150 is fluidly coupled to the condensate bottle 120 via a second condensate tube 602. A sixth air valve 160 (as an example of the second condensate liquid valve) is provided in the second condensate tube 602, and selectively communicates the second trap bottle 150 with the condensate bottle 120. That is, when the sixth air vale 150 is open, the condensate liquid in the second trap bottle 150 may be drained into the condensate bottle 120 via the second condensate tube 602. It could be understood, if positive pressure is proved in the second trap bottle 150 by the pressure generating assembly 50 through the second air tube 502, the condensate liquid may be discharged rapidly into the condensate bottle 120.

A twelfth liquid valve 170 (as an example of the purge valve) is provided in the fourth air tube 504. The twelfth liquid valve 170 selectively communicates the second air valve 58 with the valve manifold 70. The twelfth liquid valve 170 may be integrated on the valve manifold 70, to simplify the structure of the tissue processor 1000. The valve manifold 70 may be disposed vertically, and the twelfth liquid valve 170 may be provided on an end of the valve manifold 70 away from the rotary valve 60.

The first common port 566 is fluidly coupled to an air manifold 180 via a fifth air tube 505.

The air manifold 180 is fluidly coupled to the ambient via a sixth air tube 506, and a fan 280 is provided in the sixth air tube 506 to help draw or expel the air from or back to the ambient rapidly; and a carbon filter 290 may be provided in the sixth air tube 506 to help filter the air, e.g. to filter the reagent fume out.

The air manifold 180 is fluidly coupled to the seventeen reagent bottles 30 via seventeen seventh air tubes 507 (only one seventh air tube 507 is illustrated in the FIG. 2).

The air manifold 180 is fluidly coupled to the four infiltrating baths 40 via an eighth air tube 508.

It could be understood that, the first common port 566, the seventeen reagent bottles 30, and the four infiltrating baths 40 are in communication with the ambient through the air manifold 180.

The air manifold 180 is fluidly coupled to the condensate bottle 120 via a third condensate tube 603. The air manifold 180 is inclined. The sixth air tube 506 is fluidly coupled to a highest port of the air manifold 180, and the third condensate tube 603 is fluidly coupled to a lowest port of the air manifold 180. The air manifold 180 may serve as a condenser, and condensate liquid from the air may flow towards a lower part of the air manifold 180 and be collected in the condensate bottle 120.

A seventh air valve 190 is provided between the third and eighth air tubes 503, 508 and the four infiltrating baths 40. The seventh air valve 190 selectively communicates one of third and eighth air tubes 503, 508 with the four infiltrating baths 40.

The seventh air valve 190 has a first port 192, a second port 194 and a third port 196. The first port 192 is in communication with the four infiltrating baths 40 via a ninth air tube 509, the second port 194 is in communication with the ambient via the eighth air tube 508, the air manifold 180, and the third port 196 is in communication with the second air valve 56 via the third air tube 503. The first port 192 may be selectively communicated with one of the second and third ports 194, 196. When the first port 192 is internally communicated with the second port 194, the four infiltrating baths 40 are in communication with the ambient; and when the first port 192 is internally communicated with the third port 196, the four infiltrating baths 40 are in communication with the second air valve 58.

The third trap bottle 200 is provided in the ninth air tube 509, between the seventh air valve 190 and the four infiltrating baths 40. The third trap bottle 200 separates an infiltrating material vapor from the air and condenses it, to prevent the infiltrating material vapor from entering ninth air tube 509. A third cooling part may be provided at the third trap bottle 200 to facilitate condensing the infiltrating material vapor.

The first, second and third cooling parts may be condensing coils, and the condensing coils may be fluidly coupled between the first trap bottle 110 and the first retort 10, between the second trap bottle 150 and the second retort 20, and between the third trap bottle 200 and the four infiltrating baths 40.

The third trap bottle 200 is fluidly coupled to the condensate bottle 120 via a fourth condensate tube 604. An eighth air valve 210 (as an example of the third condensate liquid valve) is provided in the fourth condensate tube 604, and selectively communicates the third trap bottle 200 with the condensate bottle 120. That is, when the eighth air vale 210 is open, the condensate liquid in the third trap bottle 200 may be drained into the condensate bottle 120 via the fourth condensate tube 604. It could be understood, if positive pressure is proved in the third trap bottle 200 by the pressure generating assembly 50 through the ninth air tube 509, the condensate liquid may be discharged rapidly into the condensate bottle 120.

A first pressure sensor 220 and a first relief valve 230 are provided to the first air tube 501. The first pressure sensor 220 detects the pressure in the first air tube 501. When the detected pressure exceeds a safety threshold, the first relief valve 230 may be opened to release the pressure, ensuring the safety of the air system. For example, the safety threshold value may be 50 kPa.

A second pressure sensor 240 and a second relief valve 250 are provided to the second air tube 502. The second pressure sensor 240 detects the pressure in the second air tube 502. When the detected pressure exceeds a safety threshold, the second relief valve 250 may be opened to release the pressure, ensuring the safety of the air system.

A first density meter 260 is provided in the first liquid tube 301. The first density meter 260 can detect the density of the reagent in the first liquid tube 301, to determine whether the selected reagent is proper.

A second density meter 270 is provided in the fifth liquid tube 305. The second density meter 270 can detect the density of the reagent in the fifth liquid tube 305, to determine whether the selected reagent is proper.

When in a first operation state of the pressure generating assembly 50, the first normally-open port 562 and the second normally-open port 582 are opened, the ambient air is input to the pump through the first air valve 56, and the compressed air is output to the first retort 10, the second retort 20, and the four infiltrating baths 40, to provide positive pressure in the first retort 10, the second retort 20, and the four infiltrating baths 40.

When in a second operation state of the pressure generating assembly 50, the second normally-closed port and the second normally-closed port are opened, the air is input to the pump through the second air valve 58 from the first retort 10, the second retort 20, and the four infiltrating baths 40, and the compressed air is output to the ambient, to provide positive pressure in the first retort 10, the second retort 20, and the four infiltrating baths 40.

As illustrated in FIG. 3, a tissue processor 1000' according to a second embodiment of the present disclosure will be described below.

The tissue processor 1000' includes a first retort 10' and a second retort 20', seventeen reagent bottles 30' and four infiltrating baths 40', and a pressure generating assembly 50'. The first and second retorts 10', 20' are in fluid communication with the seventeen reagent bottles 30', the four infiltrating baths 40' and the pressure generating assembly 50'.

The tissue processor 1000' has a substantially identical structure to the tissue processor 1000 according to the first embodiment of the present disclosure, except that the tissue processor 1000' further includes a clearing buffer 900.

The clearing buffer 900 is fluidly coupled between the valve manifold 70' and the twelfth liquid valve 170' which is separated from the valve manifold 70'. Negative pressure is provided in the clearing buffer 900, and clearing reagent may be drawn into the clearing buffer 900 from one of the seventeen reagent bottles 30' or from the remote connector 80'. Then positive pressure is provided in the clearing buffer 900, and the clearing reagent may be pushed back to the one of the seventeen reagent bottles 30' or to the remote connector 80' from the clearing buffer 900. The clearing reagent may flush and clear different residual reagents in the valve manifold 70' and the second liquid tube 302', to prevent cross contamination of different regents.

It should be noted that, the clearing agent may be alcohol, as the alcohol is miscible with other agents, facilitating flushing and clearing of the residual reagents.

The pump, the compensator, the rotary valve, the valve manifold, the air manifold, air valves and liquid valves or the like are commonly used in the field and are available in the market.

Other structures and principles of a tissue processor can be acknowledged by a person skilled in the art, which will not be elaborated herein.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the present disclosure, the term "a plurality of" means two or more than two, unless specified otherwise.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A tissue processor, comprising:
a first retort;
a second retort;
a plurality of reagent bottles fluidly coupled with the first retort and the second retort;
a plurality of infiltrating baths fluidly coupled with the first retort and the second retort;
a pressure generating assembly fluidly coupled with the first retort, the second retort, the plurality of reagent bottles, and the plurality of infiltrating baths, the pressure generating assembly configured to provide positive or negative pressure in at least one of the first retort and the second retort, to draw or drain reagent or infiltrating material into or from the respective retort; and
a rotary valve fluidly coupling the first and second retorts with the plurality of reagent bottles, and configured to selectively communicate with one of the plurality of reagent bottles with the first and second retorts, wherein the tissue processor further comprises a first trap bottle and a second trap bottle, the first trap bottle is fluidly coupled between the first retort and the pressure generating assembly, the second trap bottle is fluidly coupled between the second retort and the pressure generating assembly, the first trap bottle configured to condense reagent vapor or infiltrating material vapor from the first retort, and the second trap bottle configured to condense reagent vapor or infiltrating material vapor from the second retort.

2. The tissue processor according to claim 1, further comprising a condensate bottle, wherein the condensate bottle is fluidly coupled with the first and second trap bottles, and collects condensate liquid from the first and second trap bottles.

3. The tissue processor according to claim 2, further comprising a first condensate liquid valve and a second condensate liquid valve, wherein the first condensate liquid valve is fluidly coupled between the first trap bottle and the condensate bottle, and selectively communicates the first trap bottle with the condensate bottle; and wherein the second condensate liquid valve is fluidly coupled between the second trap bottle and the condensate bottle, and selectively communicates the second trap bottle with the condensate bottle.

4. The tissue processor according to claim 2, further comprising a third trap bottle, wherein the third trap bottle is fluidly coupled between the plurality of infiltrating baths and the pressure generating assembly, and the third trap bottle condenses infiltrating material vapor from the plurality of infiltrating baths.

5. The tissue processor according to claim 4, further comprising a third condensate liquid valve, wherein the third condensate liquid valve is fluidly coupled between the third trap bottle and the condensate bottle, and selectively communicates the third trap bottle with the condensate bottle.

6. The tissue processor according to claim 2, further comprising an air manifold, wherein the air manifold is in fluid communication with ambient, and wherein the pressure generating assembly, the plurality of reagent bottles, the plurality of infiltrating baths, and the condensate bottle are fluidly coupled to the air manifold; wherein the air manifold is inclined, a highest port of the air manifold is coupled to the ambient, and a lowest port of the air manifold is coupled to the condensate bottle.

7. The tissue processor according to claim 1, further comprising a valve manifold, wherein the valve manifold fluidly couples the first and second retorts with the rotary valve, and selectively communicates one of the plurality of the reagent bottles selected by the rotary valve with one of the first and second retorts.

8. The tissue processor according to claim 7, further comprising a purge valve, wherein the purge valve is fluidly coupled between the valve manifold and the pressure generating assembly, and selectively communicates the valve manifold with the pressure generating assembly.

9. The tissue processor according to claim 8, wherein the purge valve is integrated on the valve manifold.

10. The tissue processor according to claim 8, further comprising a clearing buffer, wherein the clearing buffer is fluidly coupled between the purge valve and the valve manifold, and draws or drains a clearing reagent from or into the plurality of regent bottles under the positive pressure or the negative pressure provided by the pressure generating assembly.

11. The tissue processor according to claim 7, further comprising a first density meter and a second density meter, wherein the first density meter is fluidly coupled between the valve manifold and the first retort, and the second density meter is fluidly coupled between the valve manifold and the second retort; wherein the first and second density meters detect density of reagent transferred to the first and second retorts respectively.

12. The tissue processor according to claim 1, further comprising a first pressure sensor, a first relief valve, a second pressure sensor and a second relief valve, wherein the first pressure sensor and the first relief valve are provided between the pressure generating assembly and the first retort, the first pressure sensor detects a first pressure in a first air tube coupled between the pressure generating assembly and the first retort, and when the detected pressure exceeds a safety threshold, the first relief valve is opened to relieve pressure;

wherein the second pressure sensor and the second relief valve are provided between the pressure generating assembly and the second retort, the second pressure sensor detects a second pressure in a second air tube coupled between the pressure generating assembly and the second retort, and when the detected second pressure exceeds the safety threshold, the second relief valve is opened to relieve pressure.

13. The tissue processor according to claim 1, further comprising a remote connector, wherein the remote connector is fluidly coupled to the rotary valve, the remote connector is configured to couple a remote container, to draw reagent from the remote container, or drain the reagent to the remote container.

14. The tissue processor according to claim 1, further comprising a drain connector, wherein the drain connector is fluidly coupled to the plurality of infiltrating baths, wherein the drain connector is configured to couple a remote container to drain the infiltrating material to the remote container.

15. The tissue processor according to claim 1, further comprising a carbon filter, wherein the pressure generating assembly is fluidly coupled to ambient through the carbon filter, and the carbon filter filters reagent fume out.

* * * * *